(12) United States Patent
Olofsson

(10) Patent No.: US 7,188,546 B2
(45) Date of Patent: Mar. 13, 2007

(54) ACCELERATOR PEDAL WITH BRAKING ACTION

(76) Inventor: Erland George Olofsson, PO Box 4766, North Rocks, NSW (AU) 2151

(*) Notice: Subject to any disclaimer, the term of this patent is extended or adjusted under 35 U.S.C. 154(b) by 41 days.

(21) Appl. No.: 10/258,199

(22) PCT Filed: May 18, 2001

(86) PCT No.: PCT/AU01/00582

§ 371 (c)(1),
(2), (4) Date: Jan. 14, 2003

(87) PCT Pub. No.: WO01/89872

PCT Pub. Date: Nov. 29, 2001

(65) Prior Publication Data

US 2004/0099085 A1    May 27, 2004

(30) Foreign Application Priority Data

May 19, 2000   (AU) .................................. 35403/00

(51) Int. Cl.
G05G 1/14      (2006.01)
F02D 9/06      (2006.01)

(52) U.S. Cl. .................... 74/513; 477/211; 477/217

(58) Field of Classification Search .................. 74/512, 74/513, 514, 560; 477/210, 211, 217
See application file for complete search history.

(56) References Cited

U.S. PATENT DOCUMENTS

| 1,774,836 | A |   | 9/1930  | Lormuller |
|-----------|---|---|---------|-----------|
| 2,162,183 | A |   | 6/1939  | Smith |
| 2,222,379 | A |   | 11/1940 | Smith |
| 2,877,880 | A |   | 3/1959  | Peebles et al. |
| 3,082,851 | A | * | 3/1963  | Sheriff et al. ............... 477/198 |
| 3,630,326 | A | * | 12/1971 | Kawaguchi ................. 477/212 |
| 3,709,338 | A | * | 1/1973  | Glen .......................... 477/192 |
| 3,891,071 | A |   | 6/1975  | Tuzson |
| 5,086,891 | A |   | 2/1992  | Rinder |
| 5,263,448 | A | * | 11/1993 | Bluhm et al. ............... 123/396 |
| 6,350,217 | B1 |  | 2/2002  | Unterforsthuber |

FOREIGN PATENT DOCUMENTS

| DE | 26 55 798 | 6/1978 |
| EP | 1 052 135 | 11/2000 |
| NL | 8000985   | 9/1981 |

* cited by examiner

*Primary Examiner*—Chong H. Kim
(74) *Attorney, Agent, or Firm*—Knobbe, Martens, Olson & Bear LLP

(57) ABSTRACT

An accelerator pedal unit (10) for a vehicle whereby an accelerator pedal (11) is moveable from a rest or first position (15) through an idle position (17) to a second position (16) and wherein vehicle braking is caused to occur when the accelerator pedal (11) moves in the range between the idle position (17) and the first position (15) and the vehicle is caused to accelerate when the accelerator pedal (11) moves between the idle position (17) and second position (16).

8 Claims, 5 Drawing Sheets

Stopping distance is shortened as a braking action is built into the accelerator pedal

PRIOR ART

Section A-A

US 7,188,546 B2

ACCELERATOR PEDAL WITH BRAKING ACTION

RELATED APPLICATIONS

This invention is a National Phase in the United States of the International Application PCT/AU/01/00582 filed May 18, 2001, and claims the benefit of Australian Application No. 35403/00 filed May 19, 2000 in Australia.

The present invention relates to an arrangement which allows an accelerator pedal of a vehicle also to influence the braking action of the same vehicle and, more particularly, to such an arrangement particularly suited, although not exclusively, to passenger vehicles driven by internal combustion engines.

BACKGROUND

In the vast majority of vehicles on the road today a driver expects to have one foot pedal devoted to causing the vehicle to be urged to increase in speed or accelerate (the accelerator pedal) and an entirely separate pedal devoted to causing braking or a positive decrease in speed when pressed (the brake pedal).

Traditionally drivers are taught to use the same foot to operate both pedals. Hence, when a driver of such a vehicle wishes to brake the vehicle it is necessary for the driver to physically lift his or her foot from the accelerator pedal, move it over to the location of the brake pedal and then move his or her foot down on the brake pedal. The physical movement of the foot from one pedal to another firstly takes time and secondly is an imprecise operation. For example, a driver, particularly an inexperienced driver or an elderly driver, can initially misplace his or her foot relative to the brake pedal. It is not unknown for a driver, in the course of transferring a foot from the accelerator pedal to the brake pedal, to move his or her foot beneath the brake pedal instead of over the top of it thereby, as a minimum, leading to an increase in the time taken to place the foot correctly on the brake pedal and initiate braking of the vehicle and, in the worse case, contributing to an accident where braking is simply not initiated in time as a result of the foot placement error causing initiation of braking action of the vehicle to take far too long.

It is an object of the present invention to overcome or ameliorate one or more of the abovementioned disadvantages or to at least provide a useful alternative.

BRIEF DESCRIPTION OF INVENTION

Accordingly, in one broad form of the invention there is provided an accelerator pedal unit for a vehicle comprising an accelerator pedal operatively connected to a vehicle urging means; said accelerator pedal arranged to operate over a predetermined pedal travel which spans from a first position to an idle position through to a second position; said pedal also operatively connected to vehicle braking means, whereby said vehicle via said urging means is caused to progressively increase magnitude of urging force applied to said vehicle as said accelerator pedal moves from said idle position to said second position; and whereby said vehicle via said braking means is caused to progressively increase magnitude of braking force applied to said vehicle as said accelerator pedal moves from said idle position to said first position; said accelerator pedal biased in use towards said first position.

Preferably when said pedal is at said idle position said positive urging force is approximately 0 and said braking force is approximately 10% of maximum braking force.

Preferably when said accelerator pedal is at said first position said urging force is approximately 0 and said braking force is approximately 60% of maximum braking force.

Preferably said vehicle further includes a brake pedal which is physically moved by said braking means to a position which corresponds with braking force applied by said accelerator pedal unit at any given time.

Preferably the brake lights of said vehicle are operated when said braking means is actuated.

Preferably said pedal is at said idle position, said positive urging force is approximately zero and said braking force is approximately zero percent of maximum braking force Preferably a mechanical detent arrangement is incorporated in said pedal so as to indicate by mechanical resistance when said pedal is at said idle position.

Preferably said pedal remains at said idle position over a predetermined angular range of movement.

Preferably said predetermined angular range of movement is approximately 5°.

BRIEF DESCRIPTION OF DRAWINGS

One embodiment of the present invention will now be described with reference to the accompanying drawings wherein.

DETAILED DESCRIPTION OF PREFERRED EMBODIMENTS

First Embodiment

Figure 1:
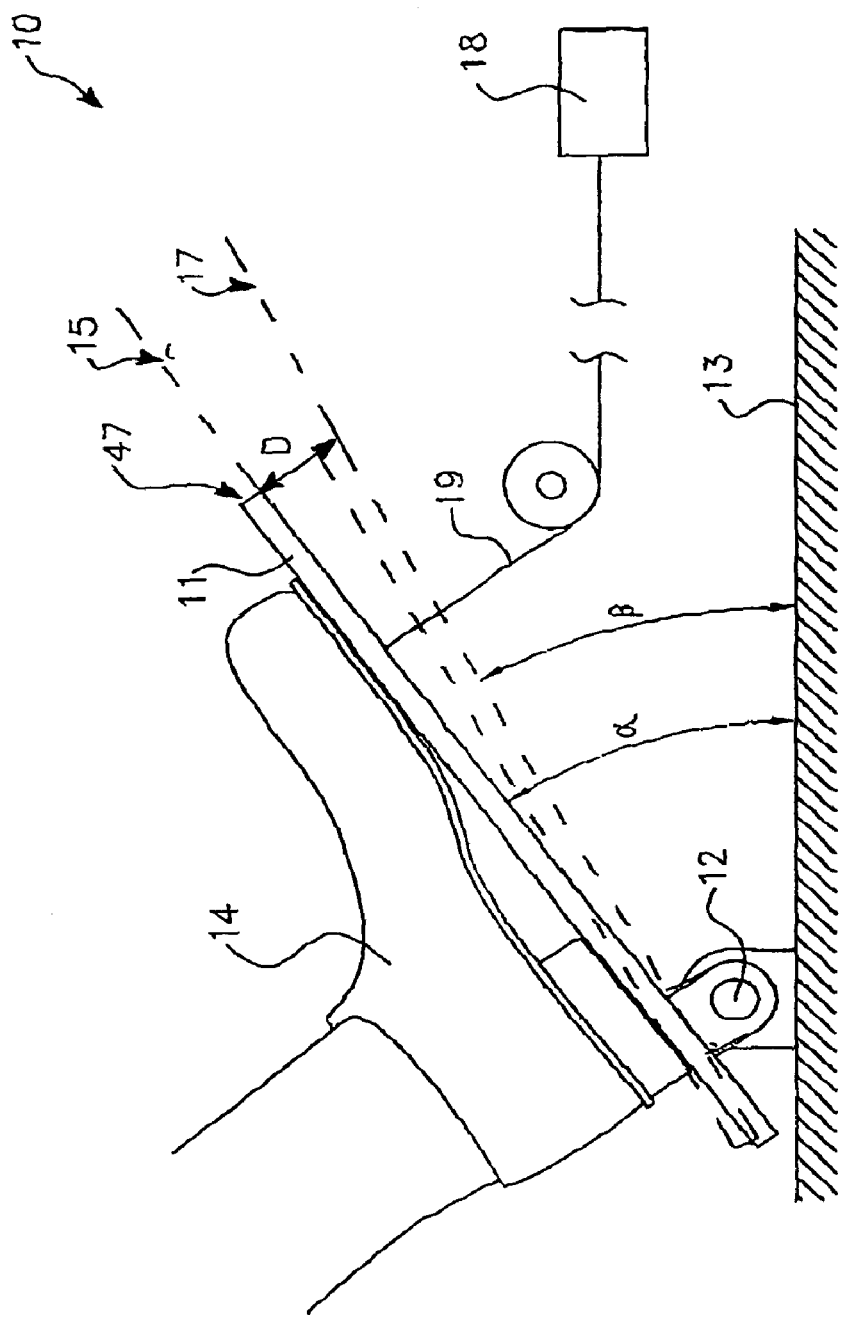
FIG. 1 is a side section, diagrammatic view of an accelerator pedal arrangement incorporating the arrangement of the present invention.

With reference to FIG. 1 there is illustrated in side section view an accelerator pedal unit 10 according to a first preferred embodiment of the invention.

The unit comprises an accelerator pedal 11 pivotable about pivot 12 relative to vehicle floor 13. The accelerator pedal 11 can be pressed by the foot 14 of a driver (not shown) so as to move through an angular distance alpha from its rest or first position 15 through to second position 16.

In passing from first position 15 to second position 16 the accelerator pedal 11 passes through an idle position 17 which, in this instance, is at beta relative to vehicle floor 13. As shown in FIG. 1 first position 15 of accelerator pedal 11 is the illustrated position at which pedal 11 is at alpha degrees with respect to vehicle floor 13.

In this instance accelerator pedal 11 communicates its angular position with respect to vehicle floor 13 to an engine urging means which, in this instance, includes a carburetor 18 via throttle wire 19.

In prior art arrangements carburetor 18 is arranged to make available increasing amounts of fuel to the vehicle internal combustion engine the further accelerator pedal 11 moves from first position 15 to second position 16.

Figure 2A:
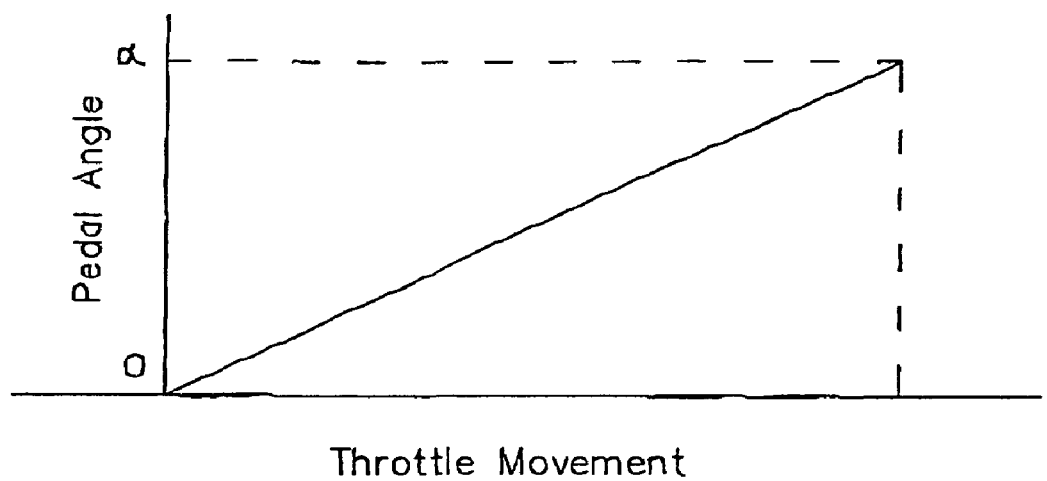
FIG. 2A illustrates graphically the prior art behaviour of a typical accelerator pedal arrangement.
Figure 2B:
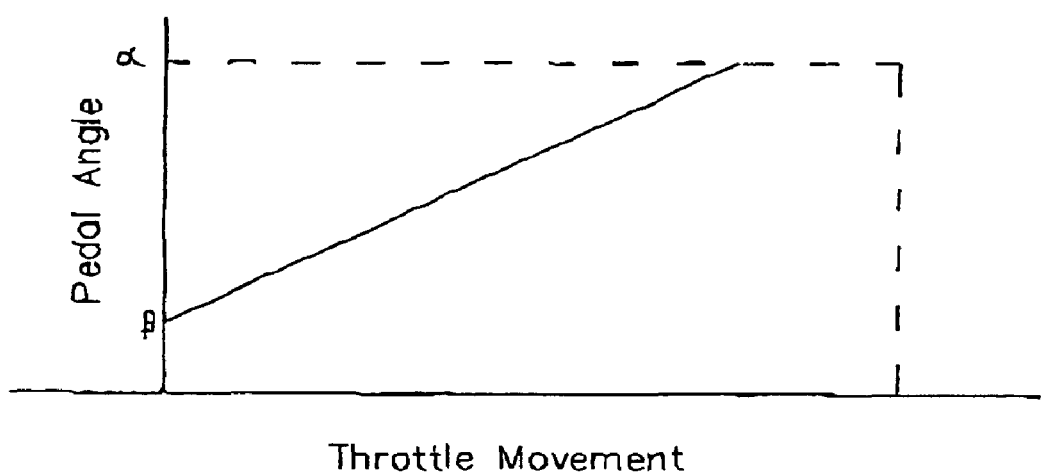
FIG. 2B illustrates graphically the behaviour of the accelerator pedal of FIG. 1 according to a first embodiment of the invention.

This behaviour of the throttle cable (and carburetor fuel availability) is illustrated graphically In FIG. 2A In the arrangement illustrated in FIG. 1 according to a first embodiment of the invention the behaviour of the accelerator pedal 11, throttle wire 19 and carburetor 18 combination is varied from the prior art as will now be described:

With reference to FIG. 2B the throttle wire 19 and carburetor 18 and their linkage is adjusted so that movement of throttle wire 19 such as to influence fuel availability via carburetor 18 commences only after accelerator pedal 11 reaches idle position 17 and thence continues to linearly increase until reaching second position 16 as illustrated in FIG. 2B.

Figure 3:
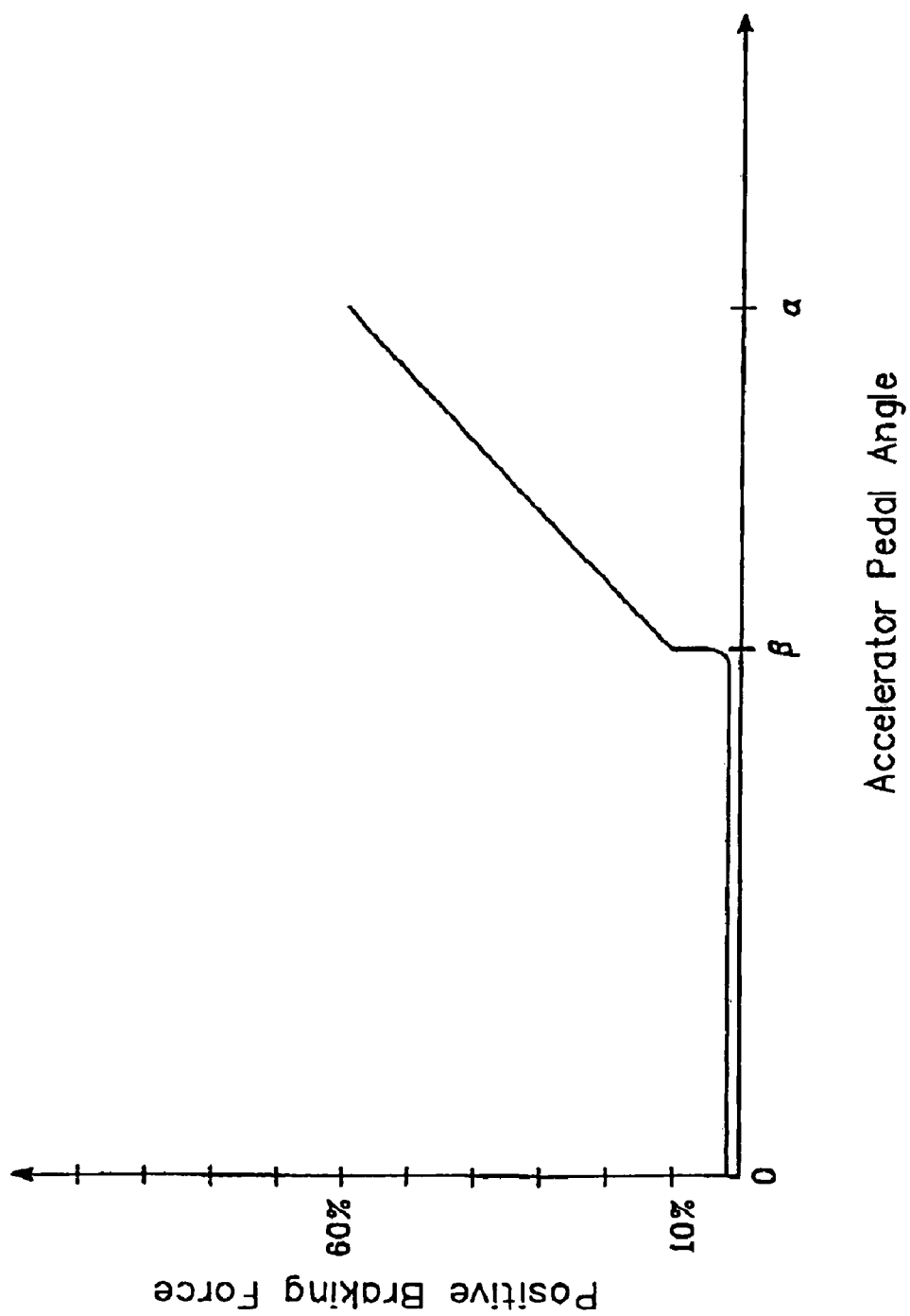
FIG. 3 illustrates graphically the behaviour of the accelerator pedal of FIG. 1 incorporating braking action according to a first embodiment of the invention.

In addition, brake urging means in the form of brake vacuum valve controller 20 is operatively connected to throttle wire 19 and thence interconnected to the vehicle main braking system such that as accelerator pedal 11 is moved from first position 15 through to idle position 17 braking force exerted by the vehicle's braking system on the vehicle is varied, in this instance, from 60% of maximum vehicle braking force at first position 15 through to 10% of maximum vehicle braking force at idle position 17. As accelerator pedal 11 passes through idle position 17 (at angle beta with respect to vehicle floor 13) braking force is rapidly reduced from 10% to 0% as illustrated in FIG. 3 thereby allowing usual vehicle acceleration in the manner illustrated in FIG. 2B as accelerator pedal 11 moves from angle beta with respect to floor 13 through to alpha degrees with respect to first position 15.

The reverse behaviour in terms of engine acceleration and vehicle braking occurs as accelerator pedal 11 moves from second position 16 back to idle position 17 and on to first position 15.

Accelerator pedal 11 is supported and biased (by means not shown) in such a way that its normal position, uninfluenced by foot 14 is first position 15 as illustrated in FIG. 1. Pressing downwardly on pedal 11 by means of foot 14 causes pedal 11 to move through idle position 17 and on to second position 16. Conversely, removal of foot 14 from accelerator pedal 11 causes the pedal to move in a direction from second position 16 through idle position 17 and on to first position 15 which is its rest position.

Figure 4:
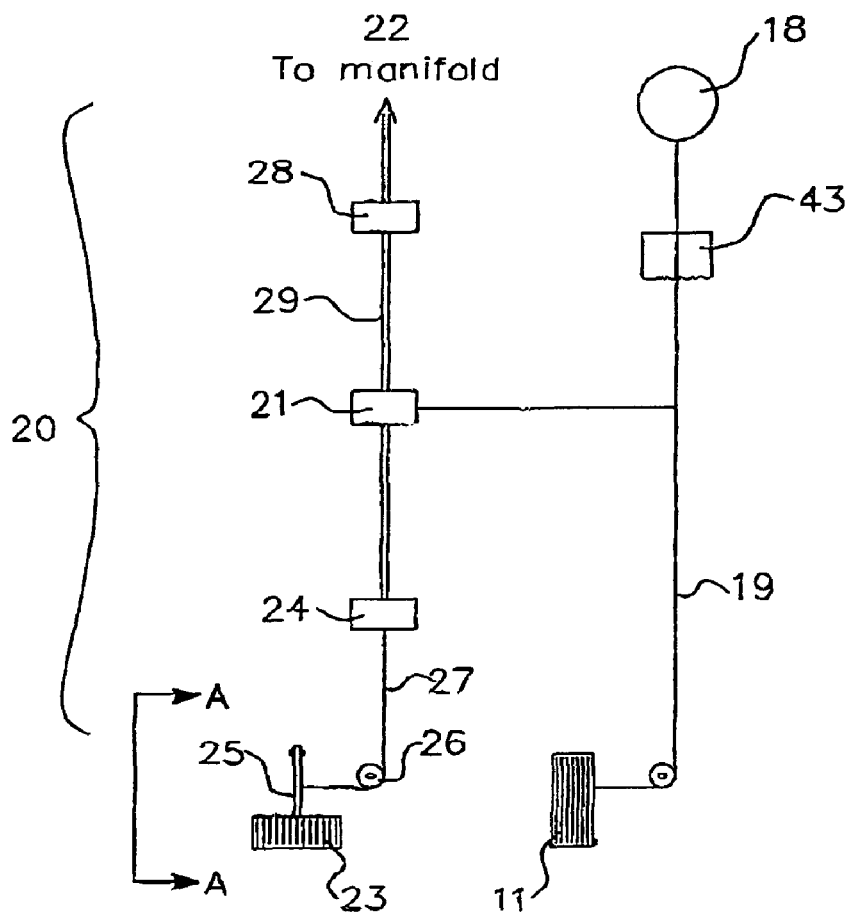
FIG. 4 is a block diagram illustrating modifications which can be incorporated into an existing accelerator arrangement of a vehicle in order to convert it to the operation of the first embodiment.
Figure 4:
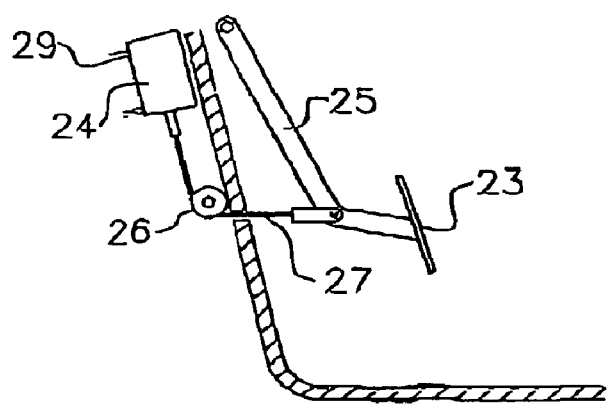

With reference to FIG. 4 the operation of brake vacuum valve controller 20 now be described in more detail.

Brake vacuum valve controller 20 comprises, in this instance, a vented vacuum valve 21 controlled by the position of and operatively connected to throttle wire 19.

The vented vacuum valve 21 utilises vacuum from engine manifold 22 to move vehicle brake pedal 23 (illustrated in FIG. 4) to change position in response to movement of throttle wire 19 over a predetermined range of movement and thereby to influence vehicle braking force over a predetermined range of movement of vehicle brake pedal 23, as would be achieved by the driver (not shown) operating vehicle brake pedal 23 in the usual manner.

In this instance the predetermined range of movement of throttle wire 19 is the movement which corresponds to movement of accelerator pedal 11 between first position 15 and idle position 17 and which corresponds, in this instance, to a vehicle braking force varying correspondingly between 60% of maximum vehicle braking force and 10% of maximum vehicle braking force as illustrated in FIG. 3.

More specifically, in this instance, the brake vacuum valve controller 20 further includes a vacuum cylinder 24 installed and connected to brake pedal arm 25 as illustrated in FIG. 4 via pulley 26 and brake wire 27. In addition a solenoid valve 28 controls the supply of vacuum via vacuum tube 29 from manifold 22 to prevent operation of brake vacuum valve controller 20 in specified circumstances.

As previously described the accelerator pedal unit 10 of the first embodiment of the present invention requires adjustment of the linkage of throttle wire 19 between carburetor 18 and accelerator pedal 11 such that, in this instance, there is about 20 mm of play in the throttle wire movement before the engine throttle/carburetor is activated to cause positive urging of the vehicle. This "play" corresponds to movement of accelerator pedal 11 from its rest or first position 15 through to idle position 17 as illustrated in FIG. 1. Over this range of movement the accelerator pedal 11, according to the first embodiment of the present invention, causes no urging of the vehicle to increase in speed but, rather, causes a positive braking action to be exerted by means of operation of brake pedal 23 by way of brake vacuum valve controller 20 as described above.

In use a driver (not shown) will enter the vehicle and start its engine thereby causing solenoid valve 28 to open allowing vacuum to pass from manifold 22 through vented vacuum valve 21 to vacuum cylinder 24 whereby pulley 26 and brake wire 27 are caused to move so as to move brake pedal arm 25 to a position which exerts vehicle braking of about, in this instance, 60% of maximum available braking force.

When the driver wishes the vehicle to move the driver presses down with his or her foot 14 on accelerator pedal 11 (refer FIG. 1) so as to, initially, move accelerator pedal from first position 15 through to idle position 11 over, in this instance, a travel distance D of far end 47 of pedal 11 of about 20 mm which results in a corresponding movement of throttle wire 19 sufficient to cause vented vacuum valve 21 to adjust the amount of manifold pressure communicated to vacuum cylinder 24 which, in turn, moves brake pedal arm 25 to a position which corresponds approximately 10% of maximum available vehicle braking force.

As the driver presses down further on accelerator pedal 11 the pedal moves past idle position 17 and in the direction of second position 16 at which time (refer FIG. 3) brake pedal arm 25 is allowed to move to its rest position whereby minimal braking force is being exerted on the vehicle and, instead, positive acceleration commences by actuation of throttle wire 19 on carburetor 18 and as illustrated graphically in FIG. 2B.

When the driver wishes the vehicle to decelerate the driver slowly lifts his or her foot 14 from accelerator pedal 11 which results in a reverse progression of events to that described immediately above wherein positive acceleration ceases as accelerator pedal 11 moves through to its idle position 17 and, at idle position 17 positive braking of approximately 10% in this instance is applied to the vehicle increasing to 60% as the accelerator pedal 11 is allowed to move to its rest or first position 15.

In most circumstances it would be expected that as accelerator pedal 11 moves from its idle position 17 through to first position 15 the driver will, at the same time, be moving his or her foot 14 from the accelerator pedal 11 over to the vehicle brake pedal 23 thereby to continue to operate brake pedal 23 in the normal manner.

However, with the accelerator pedal unit 10 of the first embodiment installed there may be circumstances where the driver can rely on the behaviour of the accelerator pedal 11 for acceleration and position braking in many driving situations.

When the engina is switched off solenoid valve 28 deactivates the system.

Similarly, in this instance, if cruise control or other automated control system of the vehicle is enabled then such control system can switch off solenoid valve 28 thereby deactivating the brake vacuum valve controller 20 and hence the accelerator pedal unit 10.

It will be observed that the arrangement according to the first embodiment allows brake pedal 23 to be utilized as normal and to override the operation of the accelerator pedal unit 10.

Furthermore, because brake pedal 23 is caused to move when accelerator pedal 11 activates the braking function it follows that the brake lights of the vehicle will be activated as is usual when the brake pedal is depressed on a normal vehicle. Thus, with this embodiment, drivers in vehicles following a vehicle modified according to the first embodiment of the present invention will not be caught by surprise.

An advantage of the mechanical implementation of the first embodiment is that it allows retention of feel over the controls and particularly the braking control.

The mechanical implementation of the first embodiment is simple and cheap to implement. The arrangement generally provides for braking to take effect more quickly than would otherwise be the case and hence it is to be expected that, in many instances, braking distance of a vehicle modified according to the first embodiment will be shortened as compared with a vehicle not so modified.

In the first embodiment as described with reference to FIG. 4 it is to be noted that the existing throttle wire 19 is utilised. This is possible in vehicles which have a throttle wire slack adjustment mechanism in the carburetor or equivalent. In an alternative version a separate wire can be used to sense position of the accelerator pedal 11.

Second Embodiment

Figure 5:
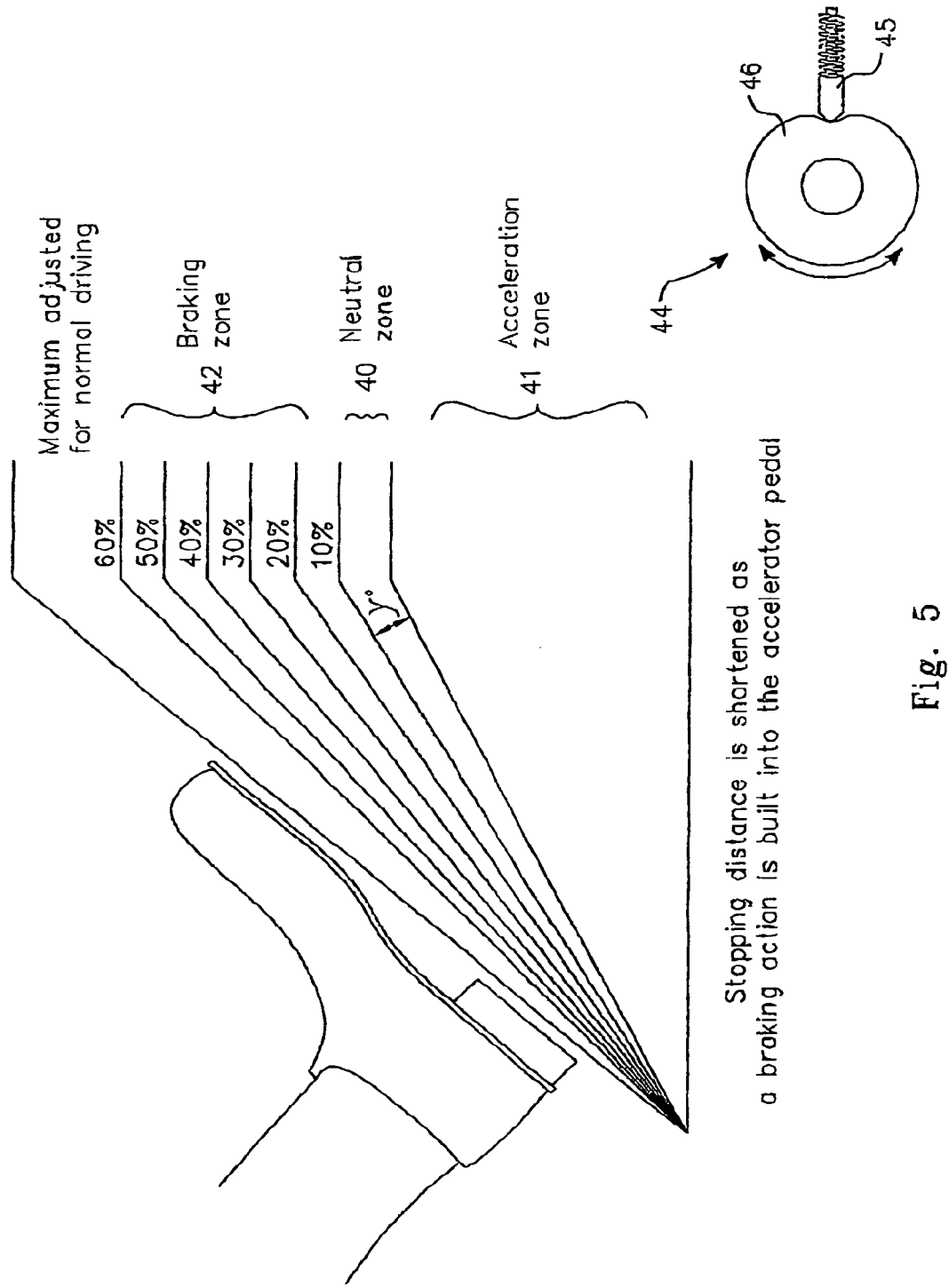
FIG. 5 is a diagram of accelerator pedal behaviour in accordance with a further embodiment of the present invention.

With particular reference to FIG. 5 modifications to the general behaviour of the braking system are possible in accordance with further embodiments of the present invention.

In particular it is possible to incorporate a neutral zone 40 interposed between acceleration zone 41 and braking zone 42 whereby, over a predetermined angular movement Y° there is neither an acceleration applied to the vehicle nor a braking effect applied to the vehicle.

With reference to FIG. 4 appropriate adjustment of the linkage of throttle wire 19 and adjustment of the linkage of brake wire 27 can provide this neutral zone. In a particular preferred form the neutral zone extends to approximately 5° of angular movement of the accelerator pedal which is to say Y=5°.

In a further particular form a mechanical detent 44 as seen in the inset of FIG. 5 can be linked in to the axis of rotation of the accelerator pedal whereby the driver feels mechanical resistance at the angular position of the accelerator pedal corresponding to neutral zone 40 brought about by the alignments of mechanical detent 45 within cam 46.

Override System

In some situations it may be appropriate for the above described system of both the first and second embodiments to be able to be overridden at the command of the driver.

In one form an override system can be implemented by inserting solenoid 43 is incorporated in the linkage of throttle wire 19 between carburetor 18 and accelerator pedal 11 as shown in FIG. 4. The optional solenoid 43 in one condition (for example energized) permits the 20 mm of play in the throttle wire movement previously referred to in the 0description of the first embodiment. In a second (non-energised) position the solenoid takes up the 20 mm of play thereby returning the behaviour characteristic of the accelerator pedal to that illustrated in FIG. 2A. This arrangement also provides a "fail safe" system whereby, should the solenoid lose power, the operation of the vehicle automatically becomes what might currently be termed "conventional" in accordance with the prior art diagram of FIG. 2A.

In a preferred system solenoids 28 and 43 are wired in series so that they are both energized and de-energised together.

The solenoid 43 can also be operated by other electronic systems within the vehicle. For example, if cruise control is enabled the solenoid may be caused to operate SO as to return the system to the operation of FIG. 2A.

In a further modification the solenoid can be arranged to exert its operation in a cushioned or controlled way, for example when cruise control is caused to cut out when the brake pedal is operated. In this situation it would be preferable if the characteristic reflected in FIG. 2B or FIG. 5 came into operation gradually rather than with immediate effect. This can be given effect by, for example, including a pneumatic resistance arrangement whereby the solenoid 43 can move to the off (de-energised) condition immediately but moving from the de-energised to the energized position will be forced to work against a pneumatic bleed arrangement which causes the solenoid ram to move at a controlled, predetermined rate to the activated position.

The above describes only some embodiments of the present invention and modifications, obvious to those skilled in the art, can be made thereto without departing from the scope and spirit of the present invention.

For example, instead of wire systems being used for throttle wire 19 and/or brake wire 27 alternative systems including cylinder and piston systems can be used.

Also the arrangement of the brake vacuum valve controller 20 of the first embodiment as illustrated particularly in FIG. 4 is particularly suited for retrofitting as a kit to vehicles after their manufacture.

The behaviour illustrated in FIG. 2B may also be achieved in other ways, for example with electronic control systems, particularly where such systems are designed into a vehicle and provided with the vehicle during its manufacture.

In the specific instance of FIG. 1 the travel distance of far end 47 of accelerator pedal 11 has been described for a distance D equal to 20 mms. In an alternative form the distance D can be increased up to 35 mm. This will be dependent upon the particular type and size of the vehicle in which the system of the present invention is installed. For most situations it would be expected that D will lie in the range 10–40 mm and, more preferably, in the range 20–35 mm.

INDUSTRIAL APPLICABILITY

The above described arrangement is particularly suited for use to modify the behaviour of accelerator pedals in passenger motor vehicles for which the primary motive source is an internal combustion engine. However the principals and behaviour of operation of the accelerator pedal in accordance with embodiments of the present invention may also be applied to other forms of vehicle and also other forms of vehicle wherein the primary motive source may be other than an internal combustion engine, for example a combined combustion engine and electric drive.

The invention claimed is:

1. An accelerator pedal unit for a vehicle said vehicle having a single separate brake pedal and a single separate accelerator pedal, the accelerator pedal unit comprising:
 a throttle wire connecting said single separate accelerator pedal to an engine of the vehicle and
 said separate brake pedal of said vehicle being connected to brakes of the vehicle; said accelerator pedal arranged to operate over a predetermined pedal travel which spans from a first position to an idle position through to a second position; and said accelerator pedal unit further comprising a brake wire connected to said separate brake pedal and connecting said accelerator pedal to said brakes of the vehicle; whereby said engine is caused to progressively increase the magnitude of urging force applied to said vehicle as said accelerator pedal moves from said idle position to said second position; and whereby said vehicle via said brakes is caused to progressively increase magnitude of braking force applied to said vehicle with corresponding induced movement of the separate brake pedal as said accelerator pedal and said throttle wire move correspondingly from said idle position to said first position; said accelerator pedal biased in use towards said first position wherein said connections of said throttle wire and said brake wire are such that said brake wire moves as said throttle wire moves between said first position of said single separate accelerator pedal and said idle position.

2. The accelerator pedal unit of claim 1 wherein when said accelerator pedal is at said idle position said urging force is approximately 0 and said braking force is approximately 10% of a maximum braking force.

3. The accelerator pedal unit of claim 1 wherein brake lights of said vehicle are operated when said brakes are actuated.

4. The accelerator pedal unit of claim 1 wherein, when said accelerator pedal is at said idle position, said positive urging force is approximately zero and said braking force is approximately zero percent of maximum braking force.

5. The accelerator pedal unit of claim 1 wherein said accelerator pedal maintains said idle position over a predetermined angular range of movement.

6. The accelerator pedal unit of claim 5 wherein said predetermined angular range of movement is approximately 5°.

7. The accelerator pedal unit of claim 1, comprising a vacuum cylinder engaged with the accelerator pedal and throttle wire and the separate brake pedal and brake wire such that operating the accelerator pedal between the idle and first positions induces the vacuum cylinder to apply a corresponding force to the brake wire to move the separate brake pedal to the position corresponding to the applied braking force.

8. The accelerator pedal of claim 1, wherein the single separate accelerator pedal is pivotable about a single pivot axis so as to be movable between the first position to the idle position and through to the second position.

* * * * *

UNITED STATES PATENT AND TRADEMARK OFFICE
CERTIFICATE OF CORRECTION

PATENT NO. : 7,188,546 B2  
APPLICATION NO. : 10/258199  
DATED : March 13, 2007  
INVENTOR(S) : Erland G. Olofsson It is certified that error appears in the above-identified patent and that said Letters Patent is hereby corrected as shown below:

Title Page  
Item (56), (U.S. Patent Documents), line 4, delete "3/1959" and insert -- 2/1955 --

Column 1  
Line 58, delete "means," and insert -- means; --

Column 2  
Line 16, after "force" insert -- . --

Column 3  
Line 12, delete "In FIG. 2A" and insert -- in FIG. 2A. --  
Line 54, after "20" insert -- will --

Column 4  
Line 39, delete "11" and insert -- 17 --

Column 5  
Line 8 (Approx.), delete "engina" and insert -- engine --  
Line 67, delete "alignments" and insert -- alignment --

Column 6  
Line 11, delete "0description" and insert -- description --  
Line 24, delete "SO" and insert -- so --

Signed and Sealed this

Thirteenth Day of May, 2008

JON W. DUDAS  
*Director of the United States Patent and Trademark Office*